United States Patent Office 3,116,325
Patented Dec. 31, 1963

3,116,325
NOVEL β-HYDROXY-SULFANAMIDES
Donald L. Klass, Barrington, Ill., assignor to The Pure Oil Company, Chicago, Ill., a corporation of Ohio
No Drawing. Filed Dec. 5, 1960, Ser. No. 73,561
2 Claims. (Cl. 260—556)

This invention relates to metal salts of β-hydroxy-sulfonamides of the formula

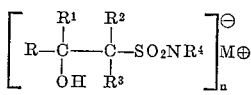

where R, $R^1$, $R^2$, and $R^3$ are the same or different groups and are either hydrogen or hydrocarbon radicals containing up to 20 carbon atoms, such as alkyl, aryl, alkaryl, aralkyl, and cycloparaffinic radicals having from 1 to 20 carbon atoms, the total number of carbon atoms in the molecule is at least 10, at least one of the radicals R, $R^1$, $R^2$, or $R^3$ is a methyl group of higher when the other groups are hydrogen, $R^4$ is a hydrocarbon radical containing from 1 to 20 carbon atoms, such as alkyl, aryl, alkaryl, aralkyl, or cycloparaffinic radicals, M is a metal, preferably an alkali metal or an alkaline earth metal, and $n$ is the valence of M.

It is known to react hexene-1 with complexed sulfur trioxide, in a sulfur trioxide-hexene mole ratio of 2/1 followed by treatment of the product with aniline, in an aniline/hexane mole ratio of 2/1, and hydrolysis of the resulting product to prepare 2-hydroxy-1-hexane-sulfonanilide. The reactions may be represented by the following equations:

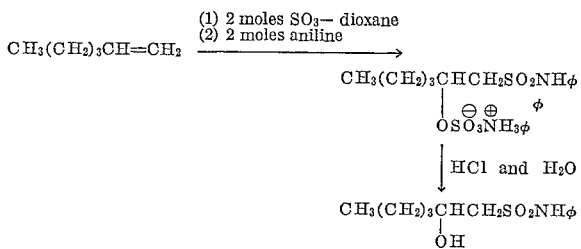

In accordance with the present invention, I have found that the β-hydroxysulfonamides prepared by the foregoing method do not have surfactant properties but may be reacted with a metal compound, particularly alkali or alkaline earth metal hydroxides or oxides to produce β-hydroxysulfonamide salts which are water-soluble and possess surface-active characteristics. More particularly, I have made the discovery that by using primary amines for the preparation of the sulfonamide, the remaining hydrogen atom on the nitrogen atom has salt-forming properties. In addition, the invention relates to the discovery that the sodium salts of β-hydroxy-1-alkyl-sulfonamides, wherein the R, $R^1$, and $R^2$ groups contain a total of at least 10 and up to about 40 to 60 carbon atoms, are adequately soluble in water, and have detergent and surface-active properties in neutral solution, but the potassium salts of the sulfonanilides share these properties only in basic solutions, when an excess of about 0.1 to 1.5% by weight of potassium base is used, when the R group contains at least 8 carbon atoms, and when $R^1$, $R^2$, and $R^3$ are H.

It becomes then a primary object of this invention to provide a new class of compounds of the foregoing formula which have surface-active properties.

Another object of this invention is to provide a sub-class of sodium salts of β-hydroxy-alkylsulfonamides which have both surface-active and detergency properties in neutral solutions.

Still another object of this invention is to provide a sub-class of potassium salts of β-hydroxy-alkylsulfonamides which have both surface-active and detergency properties in basic solution.

An object of this invention is to provide a process for making a new class of surface-active sulfonamides coming within the foregoing formula.

These and other objects of this invention will be described or become apparent as the specification proceeds.

The surfactants of this invention are prepared by reacting a suitable 1-olefin having at least 3 carbon atoms with sulfur trioxide in complexed form, using a sulfur trioxide/olefin mole ratio of about 2/1, reacting the resulting mixture with a primary amine having a sufficient number of carbon atoms to bring the total number of carbon atoms in the molecule to at least 10, using a mole ratio of amine to olefin of about 2/1, hydrolyzing the resulting product with a mineral acid to produce the β-hydroxy-1-alkane-sulfonamide and optionally drying the salt resulting from reaction with an oxide or hydroxide of an alkali or alkaline earth metal.

In order to demonstrate the invention, a series of experiments was conducted.

Example I

An aqueous solution of 200 mg. of the anilinium salt of 2-hydrosulfate-1-dodecane-sulfonanilide was prepared by reacting a dioxane-sulfur-trioxide reagent, comprising about 16 g. (0.2 mole) of sulfur trioxide, about 17.6 g. (0.2 mole of dioxane) and about 237 g. of ethylene chloride, with about 16.8 g. (0.1 mole) of dodecene-1. The reaction was carried out at about 0° C. for four hours, and the product was hydrolyzed by agitation with ice-water. The resulting anilinium salt of 2-hydrosulfate-1-dodecane-sulfonanilide was boiled with 15 ml. of 10% hydrochloric acid for 10 minutes.

After the resulting mixture had stood overnight at room temperature, 109 mg. of 2-hydroxy-1-dodecane-sulfonanilide were recovered by filtering and drying. This product was in the form of white crystals, and had a melting point, without recrystallization, of 79.5–81.5° C. The filtrate gave a positive test for sulfate ion with barium chloride solution, indicating that the sulfate ion had been removed from the intermediate product. The β-hydroxy-sulfonanilide was practically insoluble in cold and hot water, and no suds were formed when a 0.1% aqueous solution of it was shaken vigorously.

Example II

A 38.5-mg. (0.000147 mole) portion of the product of Example I was treated with 1.09 ml. of 0.1035 N potassium hydroxide solution to form the potassium salt. Then the resultant slurry was diluted with 47 ml. of distilled water to form a 0.1% aqueous suspension. The salt did not dissolve, even when the suspension was heated, and no suds formed when the 0.1% suspension was shaken vigorously. However, a clear, suds-forming solution resulted when excess potassium hydroxide was added.

Example III

Example II was repeated, using sodium hydroxide rather than potassium hydroxide, to form the sodium salt. A clear 0.1% aqueous solution was obtained. A 250 ml. Erlenmeyer flask was filled with suds when a 50-ml. portion of the 0.1% solution was shaken with moderate vigor.

Example IV

One mole of hexene-1 is added to two moles of the complex prepared from sulfur trioxide and dioxane. The reaction is carried out at 0° C. in 75 ml. of ethylene dichloride. After about one hour of reaction, two moles of heptylamine are added dropwise, and the mixture is kept at room temperature for about 24 hours. A precipitate is formed which is filtered and washed with ethylene dichloride followed by air drying. This precipitate is boiled with about 20 ml. of 20% hydrochloric acid for about 10 minutes and allowed to stand overnight at room temperature. The product is 2-hydroxy-1-hexane-N-heptyl-sulfonamide. A portion of the product is treated with 3 ml. of 0.1 N sodium hydroxide to form a sodium salt of 2-hydroxy-1-hexane-N-heptyl-sulfonamide.

Example V

A second portion of the sulfonamide product of Example IV is treated with 5 ml. of 0.1 N potassium hydroxide to form the potassium salt of 2-hydroxy-1-hexane-N-heptyl-sulfonamide.

Example VI

The processes of Examples IV and V are repeated substituting octylamine for heptylamine to prepare the potassium salt of 2-hydroxy-1-hexane-N-octyl-sulfonamide.

By following the foregoing procedures using different olefinic starting materials and different amine reactants, along with the hydroxides or oxides of the indicated alkali metals or group II, the following species of compounds are prepared to illustrate the invention:

Sodium salt of 2-hydroxy-1-propane-N-heptyl-sulfonamide
Potassium salt of 2-hydroxy-1-hexane-N-octyl-sulfonamide
Lithium salt of 2-hydroxy-1-propane-N-nonyl-sulfonamide
Cesium salt of 2-hydroxy-1-propane-N-decyl-sulfonamide
Rubdium salt of 2-hydroxy-1-propane-N-undecyl-sulfonamide
Calcium salt of 2-hydroxy-1-propane-N-tridecyl-sulfonamide
Strontium salt of 2-hydroxy-1-propane-N-tetradecyl-sulfonamide
Barium salt of 2-hydroxy-1-propane-N-pentadecyl-sulfonamide
Magnesium salt of 2-hydroxy-1-propane-N-dodecyl-sulfonamide Sodium salt of 2-hydroxy-1-butane-N-hexyl sulfonamide
Potassium salt of 2-hydroxy-1-butane-N-hexadecyl sulfonamide
Lithium salt of 2-hydroxy-1-pentane-N-pentyl sulfonamide
Cesium salt of 2-hydroxy-1-pentane-N-licosyl sulfonamide
Rubidium salt of 2-hydroxy-1-heptane-N-undecyl sulfonamide
Calcium salt of 2-hydroxy-1-octane-N-ethyl sulfonamide
Strontium salt of 2-hydroxy-1-nonane-N-methyl sulfonamide
Barium salt of 2-hydroxy-1-decane-N-eicosyl sulfonamide
Magnesium salt of 2-hydroxy-1-dodecane-N-eicosyl sulfonamide Sodium salt of 2-hydroxy-2-phenyl-1-propane-N-methyl-sulfonamide
Potassium salt of 2-hydroxy-2-phenyl-1-butane-N-ethyl-sulfonamide
Lithium salt of 2-hydroxy-2-napthyl-1-pentane-N-isopropyl-sulfonamide
Cesium salt of 2-hydroxy-2-anthryl-1-hexane-N-octyl-sulfonamide
Rubidium salt of 2-hydroxy-benzyl-1-dodecane-N-isobutyl-sulfonamide
Calcium salt of 2-hydroxy-tolyl-1-undecane-N-eicosyl-sulfonamide
Strontium salt of 2-hydroxy-cyclohexyl-1-propane-N-methyl-sulfonamide
Barium salt of 2-hydroxy-cyclopentyl-1-decane-N-t-butyl-sulfonamide
Magnesium salt of 2-hydroxy-cyclopropyl-1-octane-N-heptyl-sulfonamide
Sodium salt of 2-hydroxy-phenethyl-1-propane-N-methyl-sulfonamide
Potassium salt of 2-hydroxy-xylyl-1-octane-N-ethyl-sulfonamide
Lithium salt of 2-hydroxy-biphenyl-1-propane-N-dodecyl-sulfonamide
Cesium salt of 2-hydroxy-phenpropyl-1-hexane-N-nonyl-sulfonamide Rubdium salt of 2-hydroxy-2-nonyl-1-propane-sulfonanilide
Calcium salt of 2-hydroxy-2-dodecyl-1-butane-sulfonanilide
Strontium salt of 2-hydroxy-2-eicosyl-1-octane-sulfonanilide
Barium salt of 2-hydroxy-2-cyclohexyl-1-propane sulfonanilide
Magnesium salt of 2-hydroxy-2-cyclopentyl-1-octane-sulfonanilide
Sodium salt of 2-hydroxy-2-benzyl-1-dodecane-sulfonanilide
Potassium salt of 2-hydroxy-2-naphthyl-1-dodecane-sulfonanilide
Lithium salt of 2-hydroxy-2-anthryl-1-propane-sulfonanilide
Cesium salt of 2-hydroxy-2-biphenyl-1-hexane-sulfonanilide
Rubidium salt of 2-hydroxy-2-xylyl-1-dodecane-sulfonanilide
Calcium salt of 2-hydroxy-2-phenethyl-1-dodecane-sulfonanilide Sodium salt of 2 hydroxy-2-methyl-1-propane-N-hexyl sulfonamide
Potassium salt of 2-hydroxy-2-ethyl-1-butane-N-butyl sulfonamide
Lithium salt of 2-hydroxy-2-hexyl-1-heptane-N-isopropyl sulfonamide
Cesium salt of 2-hydroxy-2-nonyl-1-dodecane-N-tert-butyl sulfonamide
Rubidium salt of 2-hydroxy-2-tridecyl-1-eicosane-N-pentyl sulfonamide
Calcium salt of 2-hydroxy-2-isobutyl-1-propane-N-nonyl sulfonamide
Strontium salt of 2-hydroxy-2-t-butyl-1-octane-N-methyl sulfonamide
Barium salt of 2-hydroxy-2-tetradecyl-1-pentane-N-pentyl sulfonamide
Magnesium salt of 2-hydroxy-2-eicosyl-1-eiconsane-N-heptadecyl sulfonamide Sodium salt of 2-hydroxy-1-octane-sulfonanilide
Potassium salt of 2-hydroxy-1-nonane-sulfonanilide
Lithium salt of 2-hydroxy-1-decane-sulfonanilide
Cesium salt of 2-hydroxy-1-undecane-sulfonanilide
Rubidium salt of 2-hydroxy-1-dodecane-sulfonanilide
Calcium salt of 2-hydroxy-1-tridecane-sulfonanilide
Strontium salt of 2-hydroxy-1-tetradecane-sulfonanilide
Barium salt of 2-hydroxy-1-pentadecane-sulfonanilide
Magnesium salt of 2-hydroxy-1-hexadecane-sulfonanilide
Sodium salt of 2-hydroxy-1-heptadecane-sulfonanilide
Potassium salt of 2-hydroxy-1-octadecane-sulfonanilide
Lithium salt of 2-hydroxy-1-nonadecane-sulfonanilide
Barium salt of 2-hydroxy-1-eicosane-sulfonanilide The olefinic starting materials for the reactions of this invention have been in part defined by the examples supra and include any hydrocarbon material containing an olefinic double bond. Alpha-olefins having a double bond in the terminal position constitute a preferred starting material.

The only limitation attaching to the substituent R and $R_1$ groups forming part of the olefinic molecule is that these substituent groups are not reactable with the sulfur trioxide complex used under the conditions of the reaction necessary to cause reaction with the olefinic double bond. The various sulfur trioxide complexes that may be used in this reaction have, as is well known, differing reactivities. Some are reactive at low temperatures while others require elevated temperatures for the reaction. Under some conditions, the intermedate hydrosulfate may decompose faster than the amination reaction can proceed, in which event the yields of the desired products may be lowered. Where R and $R^1$ of the olefinic molecule and $R^4$ of the amine reactant are saturated alkyl radicals or cycloaliphatic radicals, no difficulty is experienced due to sulfonation occurring in the substituent group. Where R, $R^1$, and $R^2$ are aryl, alkaryl, or aralkyl groups or other slightly reactive groups that may sulfonate across a double bond within its structure, the reaction of the invention will still take place, but certain precautions are necessary to prevent sulfonation of the substituent group. This is easily overcome by the choice of the sulfur trioxide complex and the reaction temperature. The only disadvantage accompanying the use of the more complex aromatic reactable substituents is that lower temperatures may be necessary, and the reaction time may be extended.

Accordingly, the following olefinic starting materials may be used in preparing the compounds of this invention: propene-1, butene-1, pentene-1, hexene-1, heptene-1, octene-1, nonene-1, decene-1, undecene-1, dodecene-1, tridecene-1, tetradecene-1, pentadecene-1, hexadecene-1, heptadecene-1, octadecene-1, nonadecene-1, eicosene-1, isooctene, 4-methyl pentene-1, 3-methyl pentene-1, 3,3-dimethyl butene-1, isopropylethylene, 1,1-diphenylethylene, 2-methylbutene-1, heptene-1, heptene-2, heptene-3, octene-1, tetraphenylethylene, triphenylethylene, sym. diphenylethylene, unsym. diphenylethylene, 3,3,5,5-tetramethylheptene-1, isooctene, 5-methyl-6-ethyl-4-N-propyloctene-3, tetramethylethylene, 3,3-dimethylbutene-1, 3,3-dimethylhexene-4, 3,3-dibutylhexene-4, 3,3-dipropylhexene-4, 2,2-dimethylhexene-3, unsym.-diisopropylethylene, 2,3,4-triethylpentene-2, 2,3,4-trimethylpentene-2, 2,2,3-trimethylpentene-3, 2,3,3-tripropylpentene-1, 4-methylhexylene-1, 1-decene, 1-dodecene, 2-hexene, 2-methyl-2-hexene, 3-methyl-2-hexene, 4-ethyl-2-hexene, 5-methyl-2-hexene, 3-hexene, 2,5-dibutyl-3-hexene, and 2-methyl-3-hexene as known olefinic hydrocarbons.

Other starting materials include phenyltrimethylethylene, phenyltriethylethylene, phenyltributylethylene, phenyltripropylethylene, phenyltriisopropylethylene, phenyltriamylethylene, phenyltrihexylethylene, phenyltricyclopentylethylene, diphenyldimethylethylene, diphenyldibutylethylene, diphenyldiisopropylethylene, diphenyldicyclohexylethylene, methyltriphenylethylene, butyltriphenylethylene, propyltriphenylethylene, 3-methylphenyltrimethylethylene, naphthyltrimethylethylene, dinaphthyldimethylethylene, 2-butyl-3-phenylpentene-2, 2,3-diphenylpentene-2, triphenylbutene-1, 2-isopropyl-3-naphthylpentene-2, 2,3-dinaphthylpentene-2, trinaphthylbutene-1, benzyltrimethylethylene, dibenzyldimethylethylene, naphthyldimethylethylene, 2-methyl-3-furylpentene-2, 2-methyl-3-thienylpentene-2, 2-propylthienylpentene-2, 2-butyl-3-furylpentene-2, trianthrylbutene-1, dianthryldimethylethylene, dianthryldiisopropylethylene, 2-hexyl-3-thienylpentene-2, 2-cyclohexyl-3-thienylpentene-2, and 2-cyclohexyl-3-furylpentene-2.

The amino compound used in the second step of the reaction may be any primary amino compound capable of forming the sulfonamide group. The preferred amino compounds are primary aliphatic amines, aryl amines, alkaryl amines, and aralkyl amines, containing from 1 to 20 carbon atoms. Species of amino compounds include:

| | |
|---|---|
| Methylamine | Decylamine |
| Ethylamine | Dodecylamine |
| Propylamine | Cyclohexylamine |
| Butylamine | Cyclopentylamine |
| Isopropylamine | Benzylamine |
| Isobutylamine | Guanidine |
| Amylamine | Oleylamine |
| Isoamylamine | Eicosenylamine |
| tertiary Butylamine | Furfurylamine |
| Undecylamine | Tetrahydrofurfurylamine |
| Decylamine | Hexamethylenediamine |
| Aniline | Decamethylenediamine |
| Dimethylaminoethylamine | Propylenediamine |
| Laurylamine | Ethylenediamine |
| Phenylenediamines | 3-nitropropylamine |
| Pentylamine | 5-carbomethoxyamylamine |
| Hexylamine | 5-carbamidoamylamine |
| Isohexylamine | Diethylaminoethylthioethylamine |
| Heptylamine | |
| Octylamine | p-Ethoxycyclohexylamine |
| Nonylamine | p-Propylthiocyclohexylamine |

The metal (M) is an alkali metal or a group II metal, preferably the alkaline earth metals within group II, and includes sodium, potassium, lithium, cesium, rubidium, calcium, strontium, barium, and magnesium. The neutralization reaction is carried out by contacting the sulfonated reaction mixture with any one or more of the foregoing metals in the form of hydroxides or oxides. This step of the reaction is facilitated by using aqueous solutions of the metal hydroxides or oxides.

The acidification step following the reaction with the sulfur trioxide complex and the amine is conducted using any inorganic or organic acid having sufficient acidity to replace the hydrosulfate group with hydrogen. For this purpose the inorganic acids to be used are hydrochloric, hydrobromic, hydroiodic, hydrofluoric, sulfuric, nitric, carbonic, sulfurous acid, and the like. The organic acids include acetic, propionic, benzoic, lactic, citric, oxalic, butyric, hydrocyanic, malonic, oleic, succinic, lauric, valeric acid, and the like. Any acid capable of producing hydrogen ions may be used for this step of the reaction.

The reaction is carried out by merely bringing together the olefinic reactant with the sulfur trioxide complex at temperatures best suited for the particular complex employed. In general, sulfur trioxide complexes react at temperatures between $-10°$ to $120°$ C. A number of sulfur trioxide complexes are available for the reaction. Dioxane-sulfur trioxide, trimethylamine-sulfur trioxide, pyridine-sulfur trioxide, triethylamine-sulfur trioxide, dimethyl-formamide-sulfur trioxide, dioxane bis-sulfur trioxide, thioxane-sulfur trioxide, thioxane bis-sulfur trioxide and dimethylaniline-sulfur trioxide complexes may be used. There is a threshold temperature at which each complex becomes reactive. Consequently, the most suitable temperature range for the reaction will depend somewhat on the complexing agent used. The most suitable temperature range between $-10°$ to $120°$ C. may be found by trial experiments. In general, the reactivities of the complexes is known in the art, and as in the case of pyridine-sulfur trioxide, a temperature between about $90°$ to $120°$ C. is suitable. It may be found that the intermediates decompose faster than they are formed, in which event lower temperatures and longer contact times will be necessary.

The reaction time may be from five minutes to one day and no pressure is required. Since the complexes are solids, they are used in solution or slurry form with an inert solvent. Suitable solvents include ethylene dichloride, ethylene trichloride, various organic esters such as ethyl acetate, butyl acetate, and propyl acetate, unreactive naphthas or mineral oils, mineral spirits, VM&P naphtha, Stoddard solvent, and cyclohexane. With dioxane-sulfur trioxide as the reactant complexing agent, one expedient is to use an excess over the stipulated 1 molar quantity whereby the excess acts as a solvent for the reaction. Other of the complexing agents may be used in this manner.

Agitation is applied to the reaction in a known manner or may be omitted, although its use shortens the reaction time.

A color change will be observed generally as an indication of the completion of the first stage of the reaction. Various other expedients, such as detection of unreacted olefin or complex, may be used to follow the reaction and determine when equilibrium has been reached.

The addition of the reactant nitrogen compound in the second step of the reaction is conducted gradually with continued agitation. This stage of the reaction is easily followed since the beta-sulfato products are solids and precipitate from the reaction mixture. Various known methods of separating the solid product may be used. Filtration under vacuum is one expedient, and centrifuging or settling may also be used. The product may be used per se without separation and recrystallization although for most uses it is the better practice to separate and purify the end products. The products may be recrystallized from any of the solvents mentioned herein, or water may be used for this purpose. Identification is made through melting points, mixed melting points, refractive index, infrared analyses or analyses for the elements. The reaction may be conducted batchwise or on a continuous basis.

The step of acidifying the reaction product is readily carried out by adding a stoichiometric or excessive amount of any material capable of producing hydrogen ions in aqueous solution. The organic or inorganic acids disclosed herein are added in concentrated or diluted solutions to the reaction mixture, and the pH is adjusted to the acid side. The reaction products from this alternative procedure are separated as before described in connection with the direct method using 1 mole of complex with 1 mole of nitrogen compound.

As illustrative, non-limiting examples of the various alkyl, aryl, alkaryl, aralkyl, and cycloparaffinic radicals having from 1 to 20 carbon atoms represented by R, $R^1$, $R^2$, and $R^3$ in the formulae herein, the following are given: methyl, ethyl, propyl, isopropyl, butyl, isobutyl, t-butyl, amyl or (pentyl), isoamyl, hexyl, heptyl, octyl, phenyl, naphthyl, anthryl, benzyl, tolyl, cresyl, cyclopropyl, cyclobutyl, cyclopentyl, cyclohexyl, cycloheptyl, cyclooctyl, phenylmethyl, 2-phenyl butyl, 2-phenylamyl, etc. R, $R^1$, $R^2$, and $R^3$ may be, in accordance with one aspect of the invention, hydrogen or any hydrocarbon radical containing up to 20 carbon atoms. As long as the total number of carbon atoms is at least 10, salts of these compounds will have surfactant properties. R, $R^1$, $R^2$, and $R^3$ may all be alkyl radicals or aryl radicals, or alkaryl radicals, or aralkyl radicals, or cycloparaffinic radicals, but preferably a balance is struck between high and low mol. wt. groups in the molecule. As demonstrated, a feature of the invention comprises those compounds in which R or $R^1$ are alkyl radicals, $R^2$ and $R^3$ are hydrogen, and $R^4$ is an aryl radical, or R, $R^1$, $R^2$, and $R^3$ are alkyl and $R^4$ is aryl or R is aryl, $R^1$, $R^2$, and $R^3$ are alkyl and $R^4$ is alkyl or R is an aryl radical, and $R^1$, $R^2$, and $R^3$ are alkyl and $R^4$ is an alkyl radical.

The alkali metal salts of $\beta$-hydroxy-alkyl sulfonamides in which the alkyl chain contains at least 3 carbon atoms constitute a preferred sub-class of surfactants, particularly the sodium and potassium salts. The compounds of this invention may be used in aqueous solutions as surfactant compositions or as detergents. They may be incorporated with other solvents, cleaning agents, and compositions without departing from the spirit of the invention. The only limitations attaching to the invention appear in the appended claims.

The embodiments of the invention in which an exclusive property or privilege is claimed are defined as follows:
1. The potassium salt of $\beta$-hydroxy-1-dodecane-sulfonanilide.
2. The sodium salt of $\beta$-hydroxy-1-dodecane-sulfonanilide.

References Cited in the file of this patent
UNITED STATES PATENTS
2,236,168     Dietrich _____ Mar. 25, 1941
FOREIGN PATENTS
823,970     Germany _____ Dec. 6, 1951
OTHER REFERENCES Bergmann: The Chemistry of Acetylene and Related Compounds, page 80 (1948).

Schwartz: Surface Active Agents, pages 40–42 and 142 (1949).

Bordwell et al.: J. Amer. Chem. Soc., pages 3952–3955 (1954).